(12) United States Patent
Sakamoto et al.

(10) Patent No.: US 8,138,641 B2
(45) Date of Patent: Mar. 20, 2012

(54) PERMANENT-MAGNET ROTARY ELECTRIC MACHINE

(75) Inventors: Masafumi Sakamoto, Gumma (JP); Yoji Unoki, Gumma (JP); Toru Kobayashi, Gumma (JP)

(73) Assignee: Nidec Servo Corporation, Gunma (JP)

( * ) Notice: Subject to any disclaimer, the term of this patent is extended or adjusted under 35 U.S.C. 154(b) by 287 days.

(21) Appl. No.: 12/628,325

(22) Filed: Dec. 1, 2009

(65) Prior Publication Data

US 2010/0133929 A1 Jun. 3, 2010

(30) Foreign Application Priority Data

Dec. 2, 2008 (JP) ................................. 2008-307080
Apr. 9, 2009 (JP) ................................. 2009-094526

(51) Int. Cl.
*H02K 37/00* (2006.01)

(52) U.S. Cl. ..................................... 310/49.44; 310/114

(58) Field of Classification Search ............... 310/49.44, 310/156.01, 254.1, 261.1, 114
See application file for complete search history.

(56) References Cited

U.S. PATENT DOCUMENTS

| | | | |
|---|---|---|---|
| 4,339,679 A | 7/1982 | Urschel | |
| 4,739,201 A * | 4/1988 | Brigham et al. | 310/49.01 |
| 5,345,131 A * | 9/1994 | Torok | 310/181 |
| 5,649,349 A | 7/1997 | Greenway | |
| 5,708,310 A | 1/1998 | Sakamoto et al. | |
| 6,329,729 B1 | 12/2001 | Sakamoto | |
| 6,633,105 B2 * | 10/2003 | Ohnishi et al. | 310/429 |
| 6,670,732 B2 * | 12/2003 | Sakamoto | 310/49.44 |
| 6,674,187 B2 * | 1/2004 | Isozaki et al. | 310/49.44 |
| 6,781,260 B2 * | 8/2004 | Sakamoto | 310/49.34 |
| 7,569,953 B2 * | 8/2009 | Koike et al. | 310/49.32 |

(Continued)

FOREIGN PATENT DOCUMENTS

| | | |
|---|---|---|
| JP | 03-212149 A | 9/1991 |
| JP | 2003-134788 A | 5/2003 |
| JP | 2004-64968 A | 2/2004 |

(Continued)

OTHER PUBLICATIONS

Official Communication issued in corresponding German Patent Application No. 10 2009 047 239.8, mailed on Aug. 10, 2011.

*Primary Examiner* — Thanh Lam

(74) *Attorney, Agent, or Firm* — Keating & Bennett, LLP

(57) ABSTRACT

A permanent-magnet rotary electric machine preferably includes a stator and a rotor opposed thereto via an air gap. The stator includes a stator core having 4m (m is an integer equal to or larger than 2) main poles each having inductor teeth at a tip thereof. The rotor includes two rotor units adjacent to each other in the axial direction. Each rotor unit includes a pair of rotor magnetic poles and a permanent magnet arranged therebetween. The permanent magnets in the rotor are axially magnetized in opposite directions to each other. Each rotor magnetic pole has magnetic teeth on its outer periphery at a regular pitch. The rotor magnetic poles in each rotor unit are arranged such that the magnetic teeth of one rotor magnetic plate are offset by half a pitch from those of the other rotor magnetic pole, and the magnetic teeth of adjacent rotor magnetic poles are aligned with each other in the axial direction. The tooth pitch of the inductor teeth of each stator main pole is different from that of the magnetic teeth of the rotor magnetic pole to generate a fourth harmonic component of a permeance between the stator and the rotor zero.

10 Claims, 8 Drawing Sheets

U.S. PATENT DOCUMENTS

| | | | |
|---|---|---|---|
| 7,589,440 B2 * | 9/2009 | Oiwa et al. | 310/49.32 |
| 7,779,532 B2 | 8/2010 | Sakamoto et al. | |
| 2007/0200464 A1 | 8/2007 | Sakamoto et al. | |
| 2010/0066184 A1 | 3/2010 | Sakamoto et al. | |

FOREIGN PATENT DOCUMENTS

| | | |
|---|---|---|
| JP | 2007-89304 A | 4/2007 |
| JP | 2008-86176 A | 4/2008 |
| JP | 2008-301628 A | 12/2008 |

* cited by examiner

PERMANENT-MAGNET ROTARY ELECTRIC MACHINE

BACKGROUND OF THE INVENTION

1. Field of the Invention

The present invention relates to a permanent-magnet rotary electric machine such as, for example, a stepper motor, which includes a stator having 4m (where m is an integer equal to or larger than 2) main poles as winding cores and two hybrid permanent-magnet rotors concentrically arranged with the stator and close to the stator.

2. Description of the Related Art

Rotary electric machines such as stepper motors used in office machines are required to provide a high torque within a compact size, with low vibration.

In a hybrid (hereinafter, simply referred to as "HB type") stepper motor, a high torque can be achieved by increasing the axial thickness of a stator composed of a plurality of axially laminated plates. However, the motor diameter is determined in advance and the area of the surface of a permanent magnet of the motor from which magnetic fluxes exit is also determined. Thus, the magnetic fluxes are not increased simply by increasing the thickness of the magnet. For that reason, it is necessary to use a plurality of magnets, resulting in a structure including a plurality of HB rotors arranged in the axial direction.

More specifically, two or more rotor units are arranged in the axial direction. Each rotor unit includes a pair of magnetic rotor plates with a permanent magnet arranged therebetween. Each magnetic rotor plate has a plurality of magnetic teeth arranged at a regular pitch on its outer periphery. The rotor plates of each rotor unit are arranged with the magnetic teeth of one rotor plate offset by half a pitch from those of the other rotor plate. A spacer such as a non-magnetic disk is arranged between the rotor units. Such a multiple rotor structure, however, cannot provide a sufficiently high torque with low vibration because of the problems related to the rotor and the stator.

First, the problems related to the rotor are described. In the multiple rotor structure, the non-magnetic disk having a predetermined thickness is interposed between the rotor units for magnetic insulation, and the permanent magnets of the respective rotor units are magnetized in the same direction in the axial direction. No torque is generated at the non-magnetic disk. Moreover, the directions of interlinking magnetic fluxes from the rotor are opposite to each other around the non-magnetic disk, i.e., the boundary between two adjacent magnetic circuits, thus causing magnetic interference on the boundary between two magnetic paths. These prevent the torque from being increased. In addition, if the thickness of the non-magnetic disk is insufficient, the magnetic flux leakage occurs and makes the provided torque lower than expected. Furthermore, the use of the non-magnetic disk such as an aluminum disk increases the cost of the rotary electric machine.

The problems related to the rotor are as follows. When the axial thickness of the stator is increased to correspond to the multiple rotor structure of the rotor, the cogging torque caused by the magnetic fluxes of the permanent magnets is also increased. This cogging torque may cause a vibration torque during the motor operation or degrade the positioning accuracy.

SUMMARY OF THE INVENTION

Preferred embodiments of the present invention provide a permanent-magnet rotary electric machine that solves the aforementioned problems.

According to a preferred embodiment of the present invention, a permanent-magnet rotary electric machine includes a stator and a rotor which is opposed to the stator via an air gap and which is freely rotatable. The stator preferably includes an approximately ring-shaped core back portion and 4m main poles radially projecting from the core back portion, where m is an integer equal to or larger than 2. Each main pole has Ns inductor teeth at the tip thereof, where Ns is an integer larger than 1. The rotor includes two rotor units adjacent to each other in an axial direction parallel or substantially parallel to a rotation axis of the rotor. Each rotor unit preferably includes a pair of rotor magnetic poles and a permanent magnet arranged therebetween. Both the permanent magnets of the two rotor units are magnetized in the axial direction, but the magnetized directions thereof are opposite to each other. Each rotor magnetic pole of the rotor unit has Nr magnetic teeth arranged at a regular pitch on its outer periphery, where Ns is an integer larger than 1. In each rotor unit, the pair of rotor magnetic poles are arranged such that the magnetic teeth of one rotor magnetic pole are offset from those of the other magnetic pole by half a pitch. In the rotary electric machine having the aforementioned structure, a tooth pitch of the inductor of the main pole of the stator is different from the pitch of the magnetic teeth of the rotor magnetic pole, thereby making the fourth harmonic component of a permeance between the stator and the rotor substantially zero.

In addition, adjacent rotor magnetic poles of the two rotor units have the same polarity in the rotary electric machine having the aforementioned structure. Thus, the rotary electric machine can use both effects provided by axially dividing a magnetic path in the whole rotor into two and thus shortening the magnetic-path length, and effects provided by magnetic fields which do not interfere with each other at the boundary between the two shortened magnetic paths. Moreover, the permeance vectors of the inductor teeth can be balanced, i.e., the sum of the permeance vectors thereof can be made substantially zero, by setting the pitch of the magnetic teeth of the rotor magnetic pole and the pitch of the inductor teeth of the stator main pole to be different from each other. This "permeance-vector balancing effect" is obtained in each magnetic path. Since the rotary electric machine of the present preferred embodiment of the present invention preferably has two magnetic paths adjacent to each other in the axial direction, the "permeance-vector balancing effect" in both magnetic paths are superimposed.

The stator core may be defined by a plurality of magnetic plates. These magnetic plates can preferably be obtained by punching, for example. It is preferable to laminate the magnetic plates such that they are successively rotated by 90° in the same direction with respect to an adjacent magnetic plate. In this case, the differences of Ns permeance vectors of the fourth harmonic components of the permeances of the Ns inductor teeth, caused by the thickness difference and the magnetic directionality of the magnetic plate, for example, can be balanced in each magnetic path due to superposition of four types of permeance vectors generated by 90°-rotated lamination of the plates.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figures 1A, 1B, 1C:
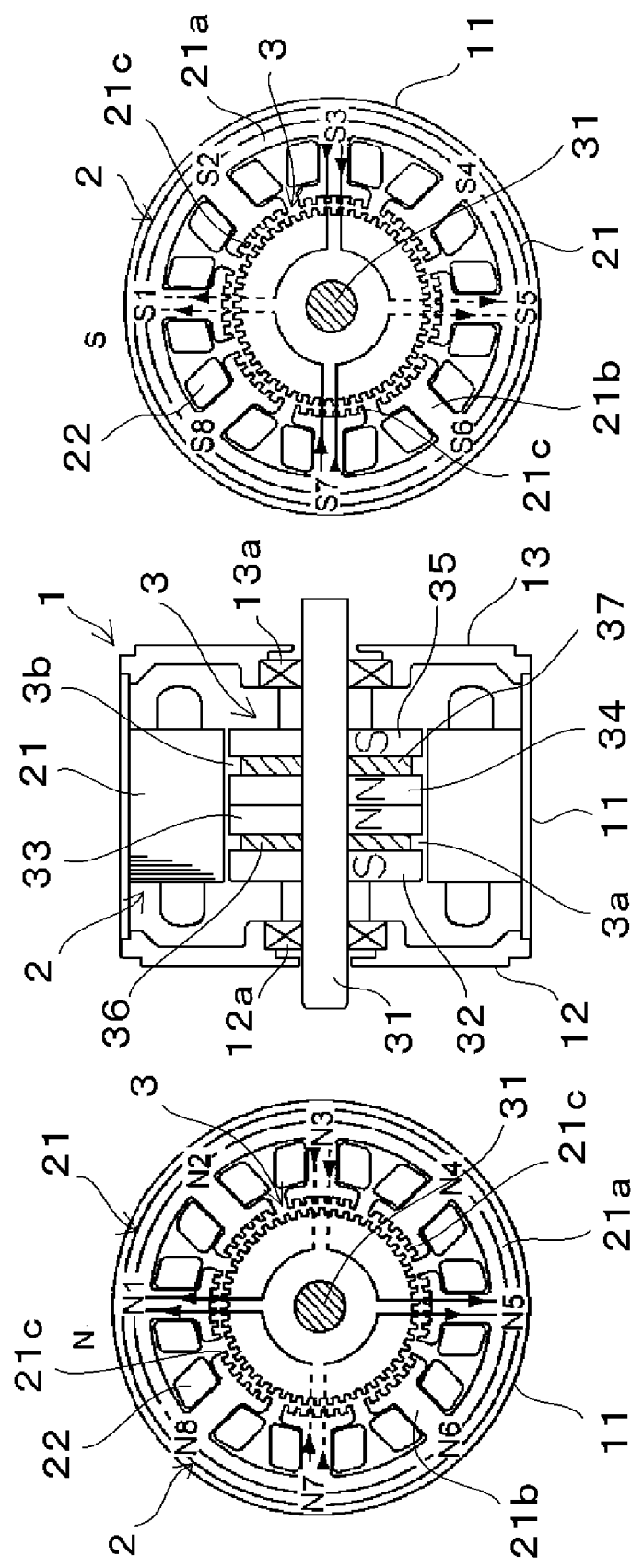
FIGS. 1A, 1B and 1C are cross-sectional views of a permanent-magnet rotary electric machine according to a first preferred embodiment of the present invention.

Referring to FIGS. 1 through 11, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel or substantially parallel to a rotation axis, and a radial direction indicates a direction perpendicular or substantially perpendicular to the rotation axis.

First Preferred Embodiment

FIGS. 1A, 1B and 1C show a rotary electric machine according to a first preferred embodiment of the present invention. In this preferred embodiment, the rotary electric machine preferably is a stepper motor which includes a two-phase stator having 4m (m is an integer equal to or larger than 2) main poles and a rotor having two HB rotor units, where m=2. That is, the stator preferably has eight main poles, for example. FIGS. 1A and 1C are cross-sectional views of the rotary electric machine which are taken along a plane perpendicular to the rotation axis of the machine and seen from the north pole side and the south pole side, respectively. FIG. 1B is a cross-sectional view of the rotary electric machine of this preferred embodiment, taken along a plane parallel to the rotation axis.

The rotary electric machine of this preferred embodiment preferably includes a motor case 1 defined by a substantially cylindrical casing 11 and endplates 12 and 13 arranged at both ends of the casing 11. The rotary electric machine also includes an approximately ring-shaped stator 2 and a rotor 3 which are arranged inside the casing 11. The stator 2 is fixed to the inside of the casing 11. The rotor 3 is arranged on the inner side of the stator 2 in the radial direction. A rotation shaft 31 of the rotor 3 is supported at both ends by bearings 12a and 13a disposed in the central regions of the endplates 12 and 13 to be freely rotatable.

The stator 2 preferably includes: a stator core 21 having an approximately circular ring-shaped magnetic body 21a and 4m (m is an integer equal to or larger than 2) main poles 21b projecting radially from the magnetic body 21a to the inside of the magnetic body 21a; and coil windings 22 arranged around the respective main poles 21b. Each main pole 21b functioning as a coil pole has Ns (Ns is an integer larger than 1) inductor teeth 21c at the tip thereof. The stator core 21 is preferably defined by a plurality of laminated silicon steel plates. In this preferred embodiment, m is 2 and Ns is 6, for example. That is, eight main poles each having six inductor teeth are preferably provided in this example.

Figure 2:
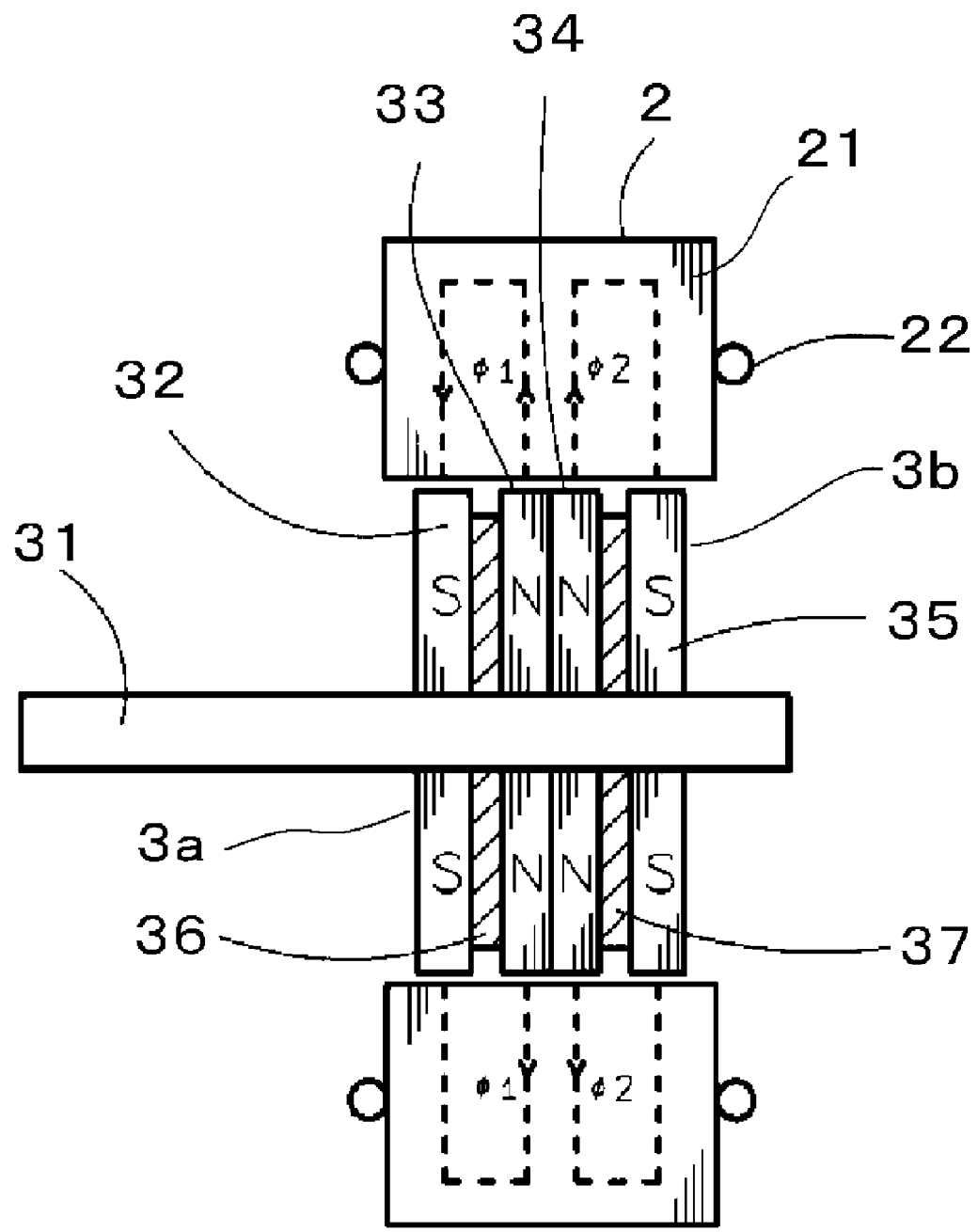
FIG. 2 is a cross-sectional view of a stator and a rotor of the rotary electric machine of FIGS. 1A to 1C.

FIG. 2 shows the stator 2 and the rotor 3 of this preferred embodiment. The rotor 3 preferably includes four rotor magnetic poles 32, 33, 34 and 35 fixed to the rotation shaft 31 and disposed side by side in the axial direction. Each of the rotor magnetic poles 32, 33, 34 and 35 is defined by a plurality of laminated plates such as, for example, silicon steel plates and has Nr (Nr is an integer larger than 1) magnetic teeth arranged at a regular pitch on its outer periphery. In a case where Nr is 50, the stepper motor of this preferred embodiment has a step angle of about 1.8°, for example.

The rotor magnetic poles 32 and 33 are arranged with their teeth offset by half a pitch from each other. The permanent magnet 36, which is disk-shaped and axially magnetized, is sandwiched between the rotor magnet poles 32 and 33. Similarly, the rotor magnetic poles 34 and 35 are arranged with their teeth offset by half a pitch from each other. The permanent magnet 37, which is disk-shaped and axially magnetized, is sandwiched between the rotor magnetic poles 34 and 35. The magnetized directions of the permanent magnets 36 and 37 are opposite to each other. The rotor magnetic poles 32 and 33 are magnetized by the permanent magnet 36 and the rotor magnetic poles 34 and 35 are magnetized by the permanent magnet 37. The adjacent rotor magnetic poles 33 and 34 of the four rotor magnetic poles have the same polarity.

In the example of the preferred embodiment shown in FIG. 2, the rotor magnetic poles 32 and 35 have south polarity, while the rotor magnetic poles 33 and 34 have north polarity. Please note that the teeth of the rotor magnetic pole 33 and those of the rotor magnetic pole 34 adjacent thereto are aligned with each other in the axial direction in principle. The rotor magnetic poles 32 and 33 and the permanent magnet 36 define a rotor unit 3a and the rotor magnetic poles 34 and 35 and the permanent magnet 37 define a rotor unit 3b. Although the rotor units 3a and 3b are in contact with each other with no space therebetween in the example of FIG. 2, the rotor units 3a and 3b may be slightly spaced away from each other.

The magnetic teeth of the respective rotor magnetic poles 32, 33, 34 and 35 of the rotor units 3a and 3b are opposed to the inductor teeth 21c of the main poles 21b of the stator 2 with an air gap defined there between in the radial direction, as shown in FIGS. 1A and 1C. A magnetic path Φ1 of magnetic flux generated by the rotor unit 3a and a magnetic path Φ2 of magnetic flux generated by the rotor unit 3b are shown in FIG. 2. As shown in FIG. 2, the magnetic paths Φ1 and Φ2 run in the same direction in the central portion of the stator 2 in the axial direction. Therefore, weakening of the magnetic fluxes by interference does not occur. This is referred to as the "effect provided by magnetic fields which do not interfere with each other at the boundary between the above two magnetic paths" in this specification.

The rotor 3 having the aforementioned structure can reduce the magnetic path length in the axial direction to a half, as compared with a case where a rotor having the same dimensions is configured by using a single rotor unit. That is, there is an advantageous effect is obtained by shortening the magnetic path. For example, the magnetic resistance is reduced by half. Thus, a low-loss rotary electric machine with small performance variations can be obtained.

The rotor magnetic poles 33 and 34 having the same polarity may preferably be arranged to be adjacent to each other with no space or with only a small space therebetween. There are magnetic flux leakage occurring between the rotor magnetic poles between which the permanent magnet is interposed, i.e., between the rotor magnetic poles 32 and 33 and between the rotor magnetic poles 34 and 35, near the outer periphery of the permanent magnet. On the other hand, almost no magnetic flux leakage occurs between the rotor magnetic poles 33 and 34 having the same polarity, and almost all the magnetic fluxes from the rotor magnetic poles 33 and 34 flow toward the stator 2. Therefore, loss of magnetic fluxes is extremely low and a high torque can be obtained.

It is assumed that eight main poles N1 to N8 of the stator 2 which are opposed to the north-polarity rotor magnetic poles 33 and 34 of the rotor 3 are arranged in that order in the clockwise direction in FIG. 1A and eight main poles S1 to S8 opposed to the south-polarity rotor magnetic poles 32 and 35 are arranged in that order in the clockwise direction in FIG. 1C, for example. The coil 22 is wound around the main poles N1 and S1, N3 and S3, N5 and S5, and N7 and S7 to define the first phase, and another coil is wound around the remaining main poles to define the second phase. A solid arrow in the N-pole side stator 2 in FIG. 1A shows the flow of magnetic fluxes from the north-polarity rotor, and a solid arrow in the S-pole side stator 2 in FIG. 1C shows the flow of magnetic fluxes from the north-polarity rotor to the south-polarity rotor.

Figure 3:
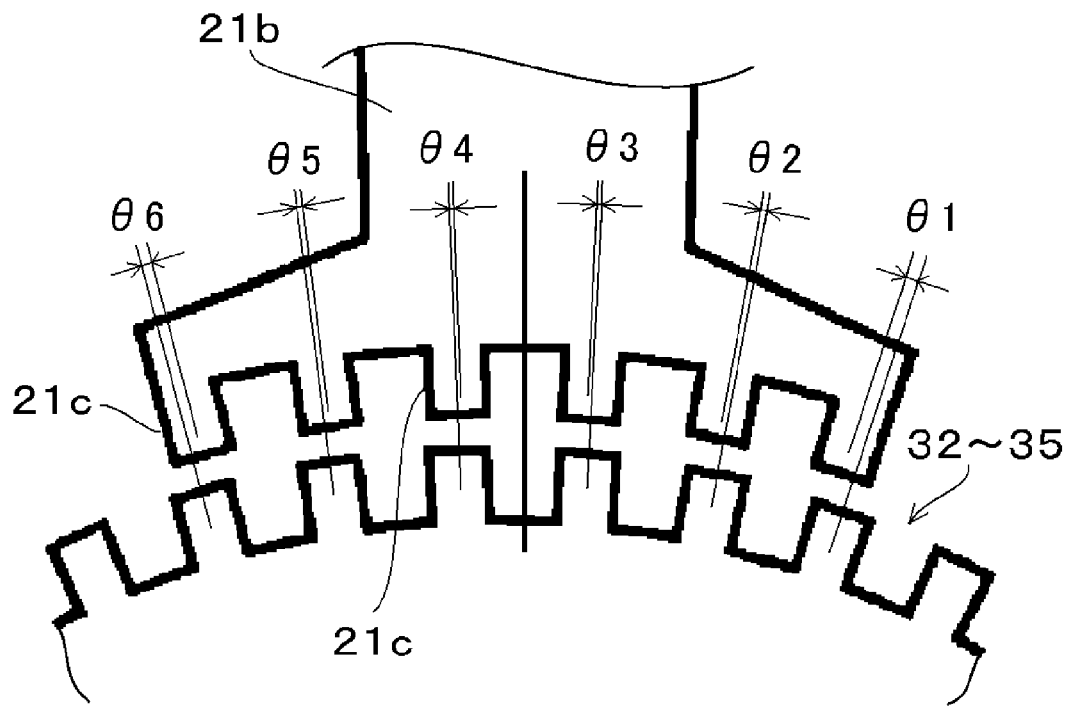
FIG. 3 shows positional relationship between inductor teeth of a main pole of the stator and magnetic teeth of a rotor magnetic pole of the rotor of the rotary electric machine of FIGS. 1A to 1C.

FIG. 3 illustrates the relationship between six inductor teeth 21c of a given main pole 21b of the stator 2 and magnetic teeth of a given rotor magnetic pole of the rotor 3 in this preferred embodiment, and shows how each inductor tooth is deviated from the opposed magnetic tooth when the center line of the main pole 21b and the center of a groove between adjacent two magnetic teeth are aligned with each other. The inductor teeth and the opposed magnetic teeth are deviated by deviation angles $\theta 1$ to $\theta 6$ in that order from the right to left in FIG. 3, respectively. Please note that an angle between the center of an inductor tooth and the center of the corresponding opposed magnetic tooth is defined as a deviation angle in this preferred embodiment. Assuming that the tooth pitch of the inductor teeth of the stator 2 is constant and smaller than that of the magnetic teeth of the rotor magnetic pole by $\theta s$, $\theta s$ is defined by approximately $360°/(n \cdot Ns \cdot Nr)$. This means minimization of the n-th harmonic component of permeance of the main pole by balancing Ns permeance vectors of the Ns inductor teeth of that main pole. In a case where the number of the magnetic teeth of rotor is Nr, the tooth pitch of the magnetic teeth of the rotor is $360°/Nr$ in mechanical angle. In this case, vectors of the fourth harmonic components of the Ns inductor teeth in the fourth harmonic plane are obtained by evenly distributing the Ns vectors on the plane of $90°/Nr$. In this preferred embodiment, when Nr is 50, Ns is 6, and n is 4, $\theta s$ is about 0.3°, for example. Since the tooth pitch of the magnetic teeth of the rotor magnetic pole is about 7.2° in mechanical angle, the tooth pitch of the inductor teeth 21c of the stator main pole is about 6.9° in mechanical angle, for example.

Assuming that the tooth pitch of the magnetic teeth of the rotor, 7.2° in mechanical angle corresponds to 360° in electrical angle, the deviation angles $\theta 1$ to $\theta 6$ are defined in electrical angle as follows.

$\theta 3 = \theta 4 = (0.3°/2)(360°/7.2°) = 7.5°$ $\theta 2 = \theta 5 = (0.3° + 0.3°/2)(360°/7.2°) = 22.5°$ $\theta 1 = \theta 6 = (0.3° + 0.3° + 0.3°/2)(360°/7.2°) = 37.5°$ Referring to FIG. 3, the fourth harmonic component P4 of the permeance of the main pole 21C, which generates the cogging torque, is obtained by Expression 1.

$$P4 = \cos(4 \cdot \theta 3) + \cos(4 \cdot \theta 2) + \cos(4 \cdot \theta 1) + \quad \text{(Expression 1)}$$
$$\cos(4 \cdot \theta 4) + \cos(4 \cdot \theta 5) + \cos(4 \cdot \theta 6)$$
$$= 2(\cos 30° + \cos 90° + \cos 150°)$$
$$= 0$$

From Expression 1, the fourth harmonic component P4 is calculated as zero.

Figure 4A:
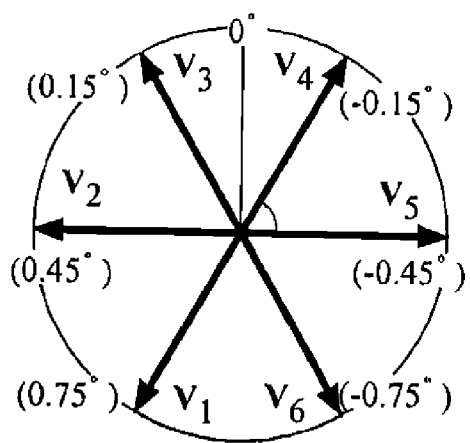
FIG. 4A shows an example of vector distribution of balancing vectors in the fourth plane for a regular-pitch arrangement of the inductor teeth according to the first preferred embodiment of the present invention.

FIG. 4A is the polar display of the fourth harmonic components of permeances of the six inductor teeth in the fourth harmonic plane. The sum of the fourth permeance vectors V1 to V6 of the respective inductor teeth is zero. In this example, the vectors when the magnetic teeth of the rotor magnetic pole are arranged symmetrically with respect to the center line of the main pole 21b as shown in FIG. 3 are balanced. On the other hand, when the rotor is rotated relative to the stator by $\lambda°$ from the position shown in FIG. 3, the vectors in the fourth plane are the same as those obtained by rotating the six vectors shown in FIG. 4A by $\lambda/4°$. Thus, the sum of the vectors is zero also in this case. As a result, the vectors of the fourth harmonic components of the permeances of the six inductor teeth are balanced for each of the eight main poles. Therefore, when the main poles are designed, it is only necessary to consider one main pole as long as all the eight main poles have completely symmetrical shapes. With that arrangement, the cogging torque components are canceled out by one another and the vibration can be suppressed to be low in theory.

The fundamental component of the permeance of the main pole 21b, which generates interlinking magnetic fluxes and functions as the motor torque, is defined by Expression 2.

$$P1 = \cos\theta 3 + \cos\theta 2 + \cos\theta 1 + \quad \text{(Expression 2)}$$
$$\cos\theta 4 + \cos\theta 5 + \cos\theta 6$$
$$= 2(\cos 7.5° + \cos 22.5° + \cos 37.5°)/6$$
$$= 0.902$$

Expression 2 shows that about 90% of the permeance remains as the torque component.

The above description is based on the assumption that the permeances of the six inductor teeth of the stator main pole 21b are quite the same. However, the distance from the center line of the stator main pole 21b of a pair of innermost inductor teeth arranged in the central region of the main pole 21b, that of a pair of intermediate inductor teeth adjacent to the innermost inductor teeth on the outside of the innermost inductor teeth, and that a pair of outermost inductor teeth adjacent to the intermediate inductor teeth on the outside of the intermediate inductor teeth are different from one another. In addition, the magnetic flux leakage for the outermost inductor teeth is different from those of the intermediate and innermost inductor teeth because the outside of the outermost inductor teeth is space. For those reasons, the sum of the fourth harmonic components of the permeances of the inductor teeth is not completely zero in fact. Therefore, it is necessary to additionally apply another approach to cancel the fourth harmonic components of the permeances of the inductor teeth.

Next, it is described that the fourth component of permeance between each main pole and the rotor opposed thereto generates a cogging torque component in a two-phase rotary electric machine. The permeance is represented in cosine representation, as described above. Since the cogging torque Tc is an angle change rate of the permeance, it can be represented as Expression 3 when the permeance is differentiated with respect to the angle and is represented by Fourier series in sine representation.

$$Tc = K_1 \cdot \sin\theta + K_2 \cdot \sin 2\theta + K_3 \cdot \sin 3\theta + K_4 \cdot \sin 4\theta + K_5 \cdot \sin 5\theta + K_6 \cdot \sin 6\theta + K_7 \cdot \sin 7\theta +$$ (Expression 3)

In Expression 3, $\theta$ is a deviation angle between an inductor tooth of the stator main pole 21b and the opposed magnetic tooth of the rotor magnetic pole, and $k_1$, $k_2$, $k_3$, ... are coefficients of respective harmonic components.

In a two-phase rotary electric machine, the main poles 21b of the stator 2 are arranged at an angular pitch of $\pi/2$. Thus, when it is assumed that a position of the center line of a main pole of the stator 2 which is coincident with the center line of the groove between adjacent magnetic teeth of the rotor 3 is a reference position, the cogging torque Tc at the p-th main pole from the reference position is represented by replacing $\theta$ with $(\theta - p \cdot \pi/2)$. In this preferred embodiment, the total cogging torque for all main poles is obtained as the sum of the cogging torques of eight main poles when p is 0 to 7, and the sums of the respective harmonic components for the eight main poles are all zero except for the fourth harmonic components in Expression 3. More specifically, when the first term to the seventh term in Expression 3 are displayed in the form of vectors in the first to seventh harmonic planes, respectively, the vectors of odd harmonic components are displayed as four types of vectors, each of which includes two vectors, and are balanced at four locations apart from each other by $\pi/2$ in electrical angle. Similarly, the vectors of even harmonic components except for the fourth harmonic components are displayed as two types of vectors, each of which includes four vectors, and are balanced at two locations apart from each other by $\pi$ in electrical angle. As for the fourth harmonic components, however, eight vectors are displayed at one location and are not balanced. The sum of the fourth harmonic components of the torque for the respective main poles is given as follows.

$$\begin{aligned} Tc/K_4 = {} & \sin(4 \cdot \theta) + \sin\{4 \cdot (\theta - \pi/2)\} + \\ & \sin\{4 \cdot (\theta - \pi)\} + \sin\{4 \cdot (\theta - 3\pi/2)\} + \\ & \sin\{4 \cdot (\theta - \pi)\} + \sin\{4 \cdot (\theta - \pi/2 - \pi)\} + \\ & \sin\{4 \cdot (\theta - 2\pi)\} + \sin\{4 \cdot (\theta - \pi/2)\} \\ = {} & 8\sin(4 \cdot \theta) \end{aligned}$$ (Expression 4)

For that reason, the cogging torque component of the two-phase rotary electric machine is formed by the fourth harmonic component thereof. This is the reason why Expression 1 should be zero. When the fourth harmonic components of the permeances do not exist, the cogging torque becomes closer to zero. The lower cogging torque is, the lower the vibration generated while the rotary machine operates is.

In a three-phase rotary machine, main poles are spaced apart from each other by $2\pi/3$ and therefore the sixth harmonic components of the permeances form the cogging torque components of the rotary machine for the similar reason. A rotary electric machine which includes a stator having 4m main poles can be used as both a two-phase machine and a three-phase machine when the number 4m of the main poles is twelve, i.e., m=3. In this case, when the permeances of the inductor teeth of each main pole are balanced based on the sixth harmonic components, $\theta s$ is defined by $360°/(6 Ns \cdot Nr)$. Thus, the following expression is obtained.

$$\theta s = 60°/(Ns \cdot Nr)$$ (Expression 5)

In a case where the Ns inductor teeth are arranged on the tip of each main pole at multiple pitches, the cogging torque reduction can be achieved by making the average of the tooth pitches of the inductor teeth different from the tooth pitch of the rotor magnetic pole by $\theta s$. Also in this case, the odd harmonic components of the cogging torque are balanced at four positions in the respective harmonic planes, whereas the even harmonic components are balanced at two positions. Thus, balancing the even harmonic components is not as easy as balancing the odd harmonic components, and balance between them can be easily lost due to insufficient component accuracy of rotary machines. The even harmonic components generate the cogging torque component in general.

For that reason, in the irregular-pitch arrangement of the inductor teeth, it is more preferable in some cases to balance the sixth harmonic components of the permeances of the inductor teeth, which are the next higher harmonic components to the fourth harmonic components, instead of balancing the fourth harmonic components. In those cases, the fundamental components acting as the motor torque are also increased. Assuming that Nr and Ns are 50 and 6 in those cases, respectively, $\theta s$ is given by Expression 5 to be about 0.2°, for example. When the average of the tooth pitches of the inductor teeth is set to be different from the tooth pitch of the magnetic teeth of the rotor magnetic pole, i.e., approximately 7.2° in this preferred embodiment, by $\theta s$, the average of the tooth pitches of the inductor teeth is set to about 7°, for example.

Figure 4B:
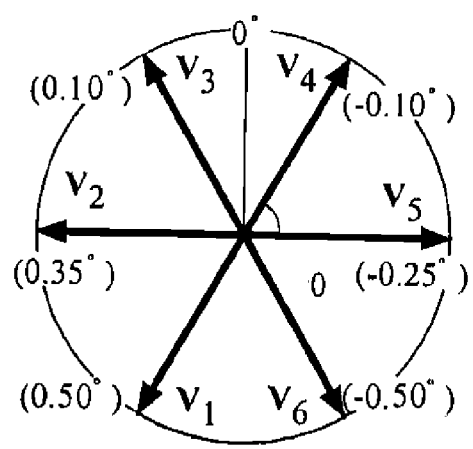
FIG. 4B shows an example of vector distribution for balancing vectors in the sixth plane for an irregular-pitch arrangement of the inductor teeth according to the first preferred embodiment of the present invention.

An exemplary rotary electric machine adopting the aforementioned irregular-pitch arrangement of this preferred embodiment is described referring to FIG. 3. When the center of six inductor teeth of a stator main pole is coincident with the center line of a groove between magnetic teeth of the rotor magnetic pole, the deviation angles of the six inductor teeth from the corresponding opposed magnetic teeth are obtained as follows:

$\theta 1 = \theta 6 = 25°(0.5°)$ $\theta 2 = 17.5°(0.35°)$ $\theta 3 = \theta 4 = 5°(0.1°)$ $\theta 5 = 12.5°(0.25°)$ Please note the above values of angles with no parenthesis are represented in electrical angle and the angles values in parenthesis are in mechanical angle. FIG. 4B shows polar display of six vectors of the permeances of the inductor teeth in this example in the sixth harmonic plane. As is apparent from FIG.

4B, the six vectors are balanced. The sum of the six vectors is represented by the following expression.

$$P6 = \cos(6 \cdot \theta3) + \cos(6 \cdot \theta2) + \cos(6 \cdot \theta1) + \qquad \text{(Expression 6)}$$
$$\cos(6 \cdot \theta4) + \cos(6 \cdot \theta5) + \cos(6 \cdot \theta6)$$
$$= \cos(6 \times 5°) + \cos(6 \times 17.5°) + \cos(6 \times 25°) +$$
$$\cos(6 \times 35°) + \cos(6 \times 42.5°) + \cos(6 \times 55°)$$
$$= 0$$

In this example, the tooth pitches of the inductor teeth are approximately 7.05°, 6.95°, 7.0°, 7.05°, and 6.95° in that order from right to left in FIG. 3 and the average thereof is 7.0°. Also in this case, lamination of rotated plates for forming the stator has no problem in spite of irregular-pitch inductor teeth arrangement. It should be noted that there are a plurality of tooth pitches in the irregular-pitch inductor teeth arrangement and therefore balancing the six harmonic components described above is merely one possible example. The present invention is not limited to balancing the sixth harmonic vectors in the sixth plane.

In general, a four-pole or six-pole rotary electric machine can provide a high torque during low-speed rotation. However, during high-speed rotation the torque is lowered because of increase in the inductance of the coil windings. The number of the main poles is in inverse proportion to the wiring inductance in general. Thus, as for a two-phase rotary electric machine, a twelve-pole stator is more advantageous to provide a high torque during high-speed rotation than a four-pole stator and an eight-pole stator. Similarly, as for a three-phase rotary electric machine, a twelve-pole stator is more advantageous than a six-pole stator. This preferred embodiment of the present invention can provide a motor suitable for high-speed rotation.

As described above, the tooth pitch of the inductor teeth in the regular-pitch arrangement or the average of the tooth pitches of the inductor teeth in the irregular-pitch arrangement is made different from the tooth pitch of the rotor magnetic pole by θs in this preferred embodiment. Thus, the vectors of the harmonic components of the permeances constituting the cogging torque components can be balanced and canceled out by one another in each magnetic path in each rotor unit. Therefore, the rotary electric machine of the present preferred embodiment of the present invention can provide a high torque with low vibration during high-speed rotation. This effect is referred to as the first permeance-vector balancing effect in this specification.

In a case where the tooth pitch or the average tooth pitch of the inductor teeth of the stator main pole is set to be different from that of the magnetic teeth of the rotor by a predetermined angle θs, it is preferable that the tooth pitch or the average tooth pitch of the inductor teeth be smaller than that of the magnetic teeth by the angle θs, because the space between the adjacent main poles can be widened. This allows easier winding of coils. Moreover, in an eight-pole rotary electric machine in which Nr is 50 and Ns is 6, the number of the inductor teeth of all main poles is 48 and is close to the number Nr of the magnetic teeth of the rotor. Therefore, it is necessary to make the tooth pitch of the inductor teeth in the regular-pitch arrangement or the average tooth pitch in the irregular-pitch arrangement smaller than the tooth pitch of the magnetic teeth by θs.

Figure 5:
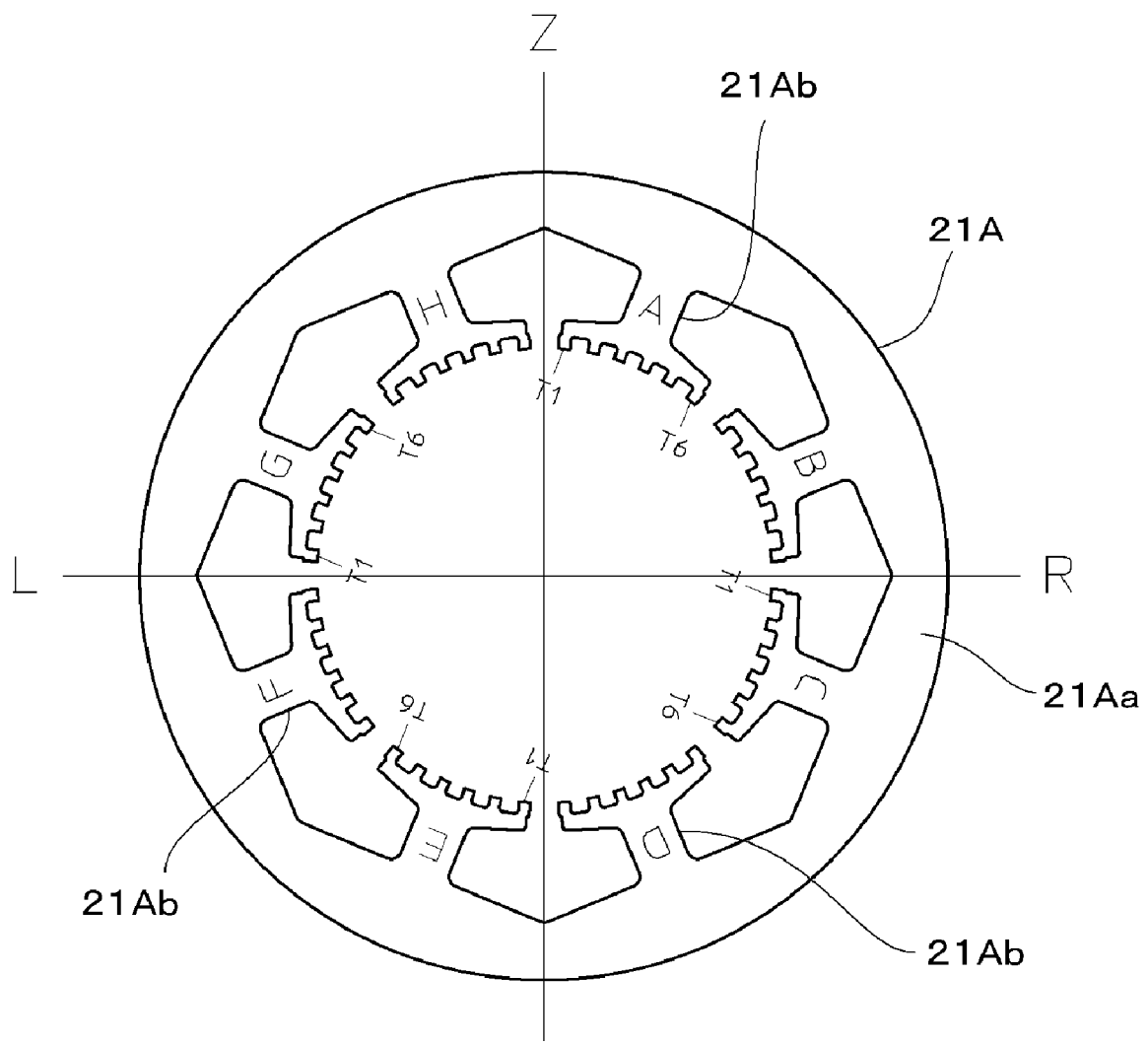
FIG. 5 is a side view of another exemplary stator core in the rotary electric machine of FIGS. 1A to 1C.

In addition to the aforementioned first permeance vector balancing, another approach is adopted for balancing the permeance vectors in this preferred embodiment. Next, the second approach is described, referring to FIG. 5. FIG. 5 shows another exemplary stator core 21A applied to the two-phase stator 2 having eight main poles of this preferred embodiment. The stator core 21 is defined by laminating silicon steel plates, for example. The silicon steel plates are preferably formed by punching a hoop of silicon steel plate during press working, but any other suitable manufacturing step or process can be used. The silicon steel plates are successively rotated by 90° in the same direction from adjacent silicon steel plates, e.g., in the counterclockwise direction. The hoop of silicon steel plate used in this preferred embodiment is a hoop of magnetic iron plate having a thickness of about 0.5 mm, for example, and containing several percents of silicon mainly to decrease eddy-current iron loss. While the hoop of silicon steel plate is being delivered toward one direction, punching of plates having a desired shape is successively performed, and then the plates are laminated to a desired thickness and fixed to one another. The longitudinal direction, i.e., the hoop winding direction of the hoop is the rolled direction of the silicon steel plate, which is shown as Z-axis in FIG. 5. The hoop used in this preferred embodiment has a width in the direction perpendicular to the longitudinal direction that is slightly larger than the diameter of the stator core, for the purpose of reducing the reminder after punching. For the sake of convenience, the stator core 21A is described by referring to Z-axis as the longitudinal direction and L-R axis perpendicular to Z-axis as shown in FIG. 5.

The stator core 21A includes a ring-shaped core back portion 21Aa having a substantially circular outer shape and preferably eight, for example, main poles 21Ab radially projecting from the core back portion 21Aa toward the inner side. Each main pole 21Ab preferably has six, for example, inductor teeth arranged at its tip at a regular pitch. For the sake of convenience, the eight main poles 21Aa serving as winding cores are referred to main poles A to H in that order in the clockwise direction in FIG. 5. The stator core 21A of the two-phase, eight-pole HB stepper motor of this preferred embodiment is formed preferably by stacking plates to a desired thickness and automatically fixing them to one another by crimping, for example. When being stacked, the plates obtained by punching are successively rotated by 90° from adjacent plates in this preferred embodiment. As a result, when four plates are laminated, all the permeances of the main poles of the lamination are substantially the same. That is, the fourth harmonic components of the permeances are the same among all the main poles. Therefore, the fourth harmonic components of the permeances can be balanced and canceled out by one another. This largely contributes to reduction of the cogging torque and the vibration.

The reasons why the cogging torque and the vibration can be largely reduced by laminating the plates rotated by 90° from adjacent plates in the aforementioned manner is described in more detail. First, when the plates defining the stator core are successively rotated by 90° from adjacent plates, the difference of the ease of passing magnetic fluxes through the hoop of silicon steel plate between the rolled direction of the hoop and the direction perpendicular thereto can be canceled in general.

Second, a hoop of a material preferably is generally formed by rolling the material to be thin, and it is likely that the distance between rollers becomes uneven in the rolling process, thus easily causing the thickness difference between on the L side and the R side. If the plates with non-constant thickness are laminated without being rotated, the thickness difference between on the L side and the R side increases as the number of the laminated plates increases. In addition, when the stator formed by such lamination is assembled with a bracket having bearings, the shaft center may be tilted and the air gap between the inner surface of the stator and the outer surface of the rotor may become uneven which may degrade the performance of a resulting stepper motor. The 90°-rotated lamination in this preferred embodiment can eliminate or minimize the thickness deviation.

Third, effects of variations which are caused by the permeance difference between in the Z-axis direction and in the R-L direction and the thickness variation in the R-L direction, on the fourth harmonic permeance vectors can be cancelled.

A non-directional magnetic plate is usually used for a motor. However, even in the non-directional magnetic plate, there is a permeance difference between in the rolled direction and in the direction perpendicular thereto. Here, it is assumed that: a hoop of a silicon steel plate is successively punched in the shape shown in FIG. 5; magnetic fluxes can easily pass through the stator core 21A in the Z-axis direction and therefore the permeance is large; and the permeance in the L-R direction is small. In this case, the main pole A portion, the main pole D portion, the main pole E portion, and the main pole H portion of each plate obtained by punching have large permeances because the longitudinal directions thereof are close to the Z-axis direction. On the other hand, the main pole B portion, the main pole C portion, the main pole F portion, and the main pole G portion of each plate have smaller permeances relative to the main pole A portion, the main pole D portion, the main pole E portion, and the main pole H portion.

Here, the main pole A of the stator core 21A is described as an example. The eight main poles are arranged symmetrically at an angular pitch of 45°, for example. Therefore, in a case where plates are successively rotated by 90° from adjacent plates in the counterclockwise direction and laminated to define the stator core 21A, the main pole A of the stator core 21A includes the main pole A portion of the first plate, the main pole C portion of the second plate, the main pole E portion of the third plate, and the main pole G portion of the fourth plate in that order and this four-plate lamination is repeated. Similarly, the main pole H of the stator core 21A includes the main pole H portion of the first plate, the main pole B portion of the second plate, the main pole D portion of the third plate and the main pole F portion of the fourth plate in that order and this lamination is repeated. Thus, the main pole A of the stator core 21A includes two larger permeance portions, i.e., the main pole A portion and the main pole E portion. The main pole H of the resultant lamination unit also includes two larger permeance portions, i.e., the main pole D portion and the main pole H portion. Both the main poles A and H include the smaller permeance portions as other two portions. Thus, the average permeance of four plates of the main pole A and that of the main pole H are the same as each other within the lamination of four plates (hereinafter, the lamination of four plates is referred to as a lamination unit). Since the lamination of four plates is repeated, the permeances of the main poles A and H are the same. Moreover, if the number of the laminated plates is not equal to the integral multiple of the number of the lamination unit, the average permeance at the position of each of the main poles A and H of the stator core 21A converges to the same value. This is the same for other main poles B to G.

When balancing of six vectors of the fourth harmonic components of the permeances of the six inductor teeth T1 to T6 of the main pole bodies in the fourth plane is considered, two larger permeance portions and two smaller permeance portions are laminated at the position of each main pole in one lamination unit. Therefore, the permeances of the eight main bodies are always the same within the lamination unit. To the contrary, in a case where the plates obtained by punching are laminated without being rotated by 90°, the main poles A, D, E, and H of the resultant stator core have larger permeances and the main poles B, C, F and G have smaller permeances. Therefore, although the permeance vectors of six inductor teeth are balanced for each main pole, there remains a permeance difference between the eight main poles. This permeance difference causes a high cogging torque or a large noise in a resultant motor, for example.

Next, a case is considered where there is a thickness variation in a steel plate which is formed by punching in the shape shown in FIG. 5. More specifically, a case is considered where a hoop having the thickness which decreases from the R side to the L side is used. For ease of description, it is assumed that the main poles A, B, C and D on the R side of Z axis have larger thickness and larger permeances than the main poles E, F, G and H on the L side of Z axis. The main body A in the lamination unit of four plates includes the main pole A portion, the main pole C portion, the main pole E portion and the main pole G portion, while the main pole H includes the main pole H portion, the main pole B portion, the main pole D portion and the main pole F portion. Therefore, the average permeances of the main bodies A and H are the same as each other. Similarly, when balancing of the fourth harmonic permeances by using the same number of vectors as the number of the inductor teeth T1 to T6 is considered, the average of six permeance vectors is the same in the eight main poles in the lamination unit because each of the eight main poles includes two larger permeance portions and two smaller permeance portions. Therefore, the permeance vectors in the fourth plane are easily balanced in each main pole, and the permeance vectors in the fourth plane is also easily balanced in the whole motor.

Figure 6:
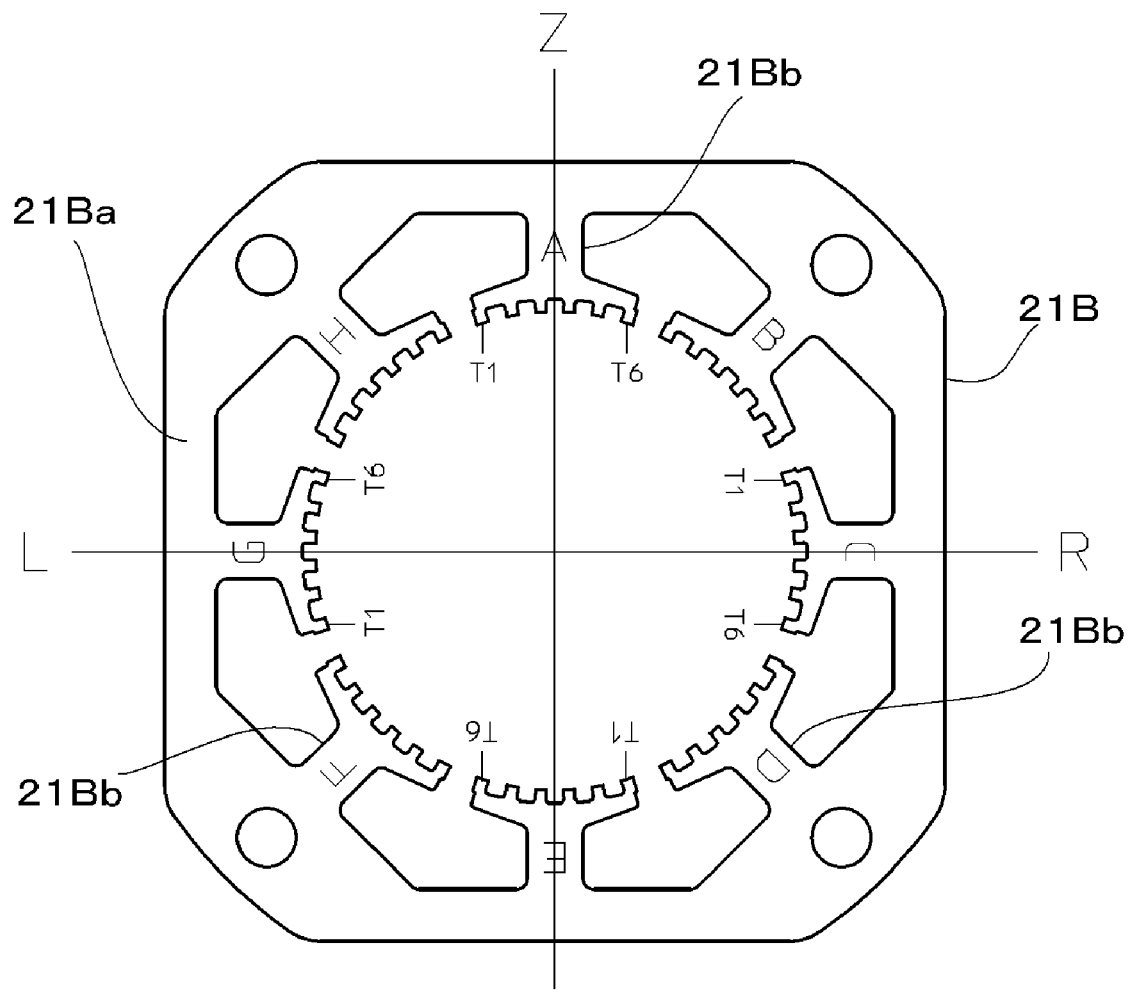
FIG. 6 is a side view of still another exemplary stator core of the rotary electric machine of FIGS. 1A to 1C.

FIG. 6 shows another exemplary stator core 21B of this preferred embodiment. The stator core 21B is a two-phase type and preferably includes eight main poles each having six inductor teeth, for example. The outer shape of the stator core 21B is approximately square. The stator core 21B includes an approximately square ring-shaped core back portion 21Ba and the main poles 21Bb radially projecting from the core back portion 21Ba toward inside of the core back portion 21Ba. When plates defining the stator core 21B are obtained by punching from a hoop having the width close to the length of each side of the approximately square core back portion 21Ba in order to reduce useless portions of the hoop, the Z-axis direction in FIG. 6 corresponds to the winding direction of the hoop. Here, it is assumed that the hoop thickness decreases from the L side to the R side. Although only the inductor teeth T1 and T6 are shown in FIG. 6 for simplifying the drawing, the inductor teeth T1 to T6 are arranged in that order in the clockwise direction.

In this example, the thickness of the main pole A of the stator core 21B decreases from the inductor tooth T1 to the inductor tooth T6. Thus, the magnitudes of the fourth permeance vectors V1 to V6 of the inductor teeth T1 to T6 gradually become smaller, to be accurate. In the following description, however, it is assumed that the magnitude of the fourth permeance vector is larger on the L side of Z axis and is smaller on the R side for simplicity of the description. Based on that assumption, the magnitudes of the fourth permeance vectors of six inductor teeth of the main poles F, G, and H are the same as one another, and are larger than those of the main poles B, C and D which are the same as one another.

In the main pole A, the fourth permeance vectors of the inductor teeth T1, T2, and T3 have the same and larger magnitude as one another, and the fourth permeance vectors of the inductor teeth T4, T5, and T6 have the same and smaller magnitude as one another. In the main pole E, the fourth permeance vectors of the inductor teeth T4, T5 and T6 have the same magnitude as one another, the fourth permeance vectors of the inductor teeth T1, T2 and T3 have the same magnitude as one another which is smaller than that of the inductor teeth T4, T5 and T6. Under those conditions, when plates for forming the stator core 21B are successively rotated and laminated to form a lamination unit, the main pole A includes the main pole A portion, the main pole C portion, the main pole E portion, and the main pole G portion in single lamination unit. For the main body E, the magnitude of the fourth permeance vectors of the inductor teeth T1, T2, and T3 is smaller while that of the inductor teeth T4, T5, and T6 is larger in each plate. Thus, the magnitudes of the fourth permeance vectors of the inductor teeth T1 to T6 are averaged by stacking the main pole A portion and the main pole E portion. Similarly, the magnitudes of the fourth permeance vectors of the inductor teeth T1 to 16 are averaged by stacking the main pole C portion and the main pole G portion. That is, in the main pole A, the main pole A portion, the main pole C portion, the main pole E portion and the main pole G portion are superimposed, thereby averaging the magnitudes of the inductor teeth T1 to T6. This is the same for other main poles B to H of the stator core 21B. As a result, six superimposed vectors are symmetrically distributed with respect to the intersection of Z axis and L-R axis in the fourth plane and therefore are balanced.

The more detailed description is provided referring to FIGS. 7A, 7B, 7C and 7D which show distribution of the fourth permeance vectors V1 to V6 of the inductor teeth T1 to T6 in the fourth plane for the main poles A, C, E and G, respectively. Since it is assumed that the inductor teeth located on the L side of Z axis have larger permeance than those located on the R side as described above, the fourth permeance vectors V1 to V6 of the inductor teeth T1 to T6 for the respective main poles A, C, E and G are distributed as shown in FIGS. 7A, 7B, 7C and 7D.

Figure 7A:
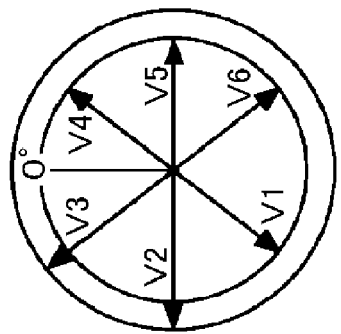
FIGS. 7A, 7B, 7C and 7D show balancing of permeance vectors for main poles A, C, E and G in the example of FIG. 6, respectively.
Figure 7B:
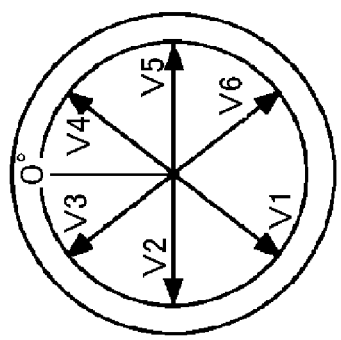
Figure 7C:
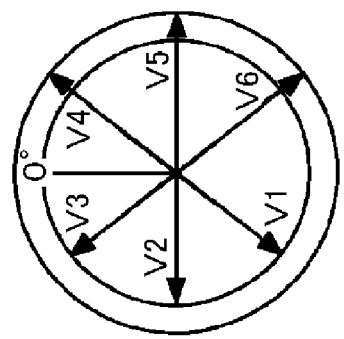
Figure 7D:
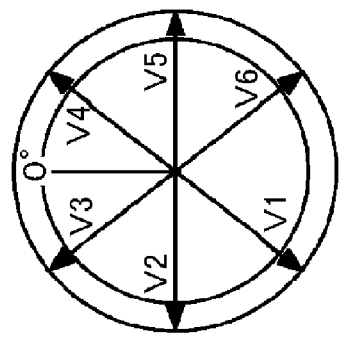

If the stator core is formed by laminating plates without rotation, the magnitudes of the fourth permeance vectors V1, V2 and V3 are larger than those of the fourth permeance vectors V4, V5 and V6 for the main pole A as shown in FIG. 7A, and therefore the fourth permeance vectors V1 to V6 are not balanced. For the main pole C, the magnitudes of the fourth permeance vectors V1 to V6 are all the same and smaller. For the main pole E, the magnitudes of the fourth permeance vectors V1, V2 and V3 are smaller than those of the fourth permeance vectors V4, V5 and V6, as shown in FIG. 7C, and are not balanced. For the main pole G, the magnitudes of the fourth permeance vectors V1 to V6 are all the same and larger, as shown in FIG. 7D. When FIGS. 7A, 7B, 7C and 7D are superimposed, it is apparent that six vectors obtained by synthesizing the permeance vectors of the inductor teeth for the main poles A, C, E and G are averaged and have the same magnitude as one another.

In the above description, it is assumed for simplifying the description that each vector has either one of two magnitudes, i.e., larger magnitude or smaller magnitude depending on whether the inductor tooth is located on the R side or the L side of Z axis. However, the above description can be applied to a case where the fourth permeance vectors V1 to V6 have magnitudes which are gradually changed. More specifically, when four plates are successively rotated by 90° and laminated to define a lamination unit, the permeance vectors of the inductor teeth of the main pole A of the lamination are averaged to have the same magnitudes by superposition of the main pole A portion and the main pole E portion. Therefore, superposition of the main pole A portion, the main pole C portion, the main pole E portion and the main pole G portion also average the permeance vectors of the six inductor teeth. This effect is provided by lamination of plates rotated by 90° and can be also obtained for the main poles B to H. In this way, the lamination of plates rotated by 90° from adjacent plates in this preferred embodiment can greatly reduce adverse effects of the permeance directionality difference in the silicon steel plates, and can significantly improve the balance of the permeance vectors of the inductor teeth in the fourth plane. In the present application, this is referred to as a second permeance-vector-balancing effect in the fourth plane. Due to this effect, reduction of the cogging torque and vibration can be achieved in a rotary electric machine.

Figure 8A:
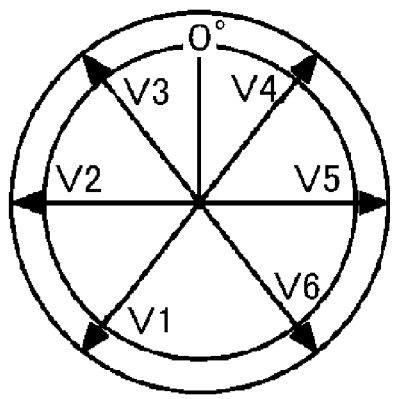
FIGS. 8A and 8B show another approach for balancing the permeance vectors in the rotary electric machine of FIGS. 1A to 1C.
Figure 8B:
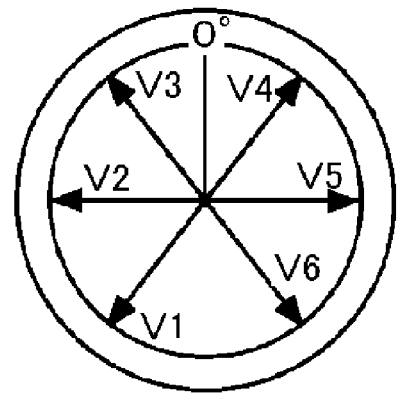

This preferred embodiment uses still another approach for balancing the permeance vectors. Next, the third approach for balancing the permeance vectors is described, referring to FIGS. 8A and 8B. In an HB type rotary electric machine, two HB type rotors are arranged as rotor units adjacent to each other in the axial direction and permanent magnets are magnetized in opposite directions in the axial direction. That is, two independent magnetic circuits are arranged in the axial direction. FIG. 8A shows the distribution of the fourth permeance vectors of six inductor teeth in the fourth plane for a magnetic path of one magnetic circuit (hereinafter, referred to as a magnetic path a) and FIG. 8B shows the distribution for a magnetic path of the other magnetic circuit (hereinafter, referred to as a magnetic path b). In a case of increasing the stator thickness in the axial direction for the purpose of increasing a torque, the arrangement of this preferred embodiment can provide a highly efficient rotary electric machine with small variations due to effects provided by dividing the magnetic path into two in the axial direction thereby shortening the magnetic path and effects provided by magnetic fields which do not interfere with each other at the boundary between the magnetic paths a and b, as described below.

In a general HB type stepper motor, the air gap dimension, i.e., the distance between the stator and the rotor preferably is about 0.05 mm, for example. Such a small air gap is obtained by performing a "horning process" for the inner surface of the stator after the steel plates are laminated. The horning process is a process for grinding the inner radius by using a cylindrical grindstone or a horning stone. However, in a case where the lamination thickness of the stator is equal to or larger than the inner diameter of the stator, it is likely that the inner diameter increases from the horning start position, e.g., the entrance of the center hole of the stator, to the horning end position, e.g., the deep portion of the center hole of the stator, due to axial runout of the grindstone and the like. Because the air gap dimension is as small as about 0.05 mm, for example, the difference of the air gap dimension causes the permeance difference even of the difference of the air gap dimension is very small. Even in the stator defined by lamination of plates rotated by 90° from adjacent plates, when the air gap dimension changes for that reason and the air gap change increases the permeance in the magnetic path a and reduces the permeance in the magnetic path b, for example, the fourth permeance vectors in the magnetic paths a and b are distributed as shown in FIGS. 8A and 8B, respectively.

However, even if the aforementioned error occurs in the finishing process, the permeance vectors for the magnetic path a and those for the magnetic path b are superimposed and averaged in a whole motor because the rotor units 3a and 3b are fixed to have the same rotation axis. Therefore, variations between different motors such as a cogging torque are very small. Moreover, it is expected that the flexibility of the second permeance-vector balancing, in which variations of the six permeance vectors of the fourth harmonic components of the permeances of the six inductor teeth caused by the thickness variation and magnetic directionality of the magnetic plates formed by punching are balanced by laminating the plates rotated by 90° from adjacent plates, can be enhanced by superimposing four types of vectors obtained by 90°-rotated lamination in one magnetic path a and those in the other magnetic path b.

In the above description, a case is described where the stator preferably includes eight main poles each preferably including six inductor teeth arranged at a regular pitch and the fourth harmonic vectors are balanced. In a stator having twelve main poles, the same effects can be obtained by laminating plates which are rotated by 90° from adjacent plates as described above. Moreover, the above description can be applied to a case of the sixth harmonic vectors. The effect described above is referred to as the third permeance-vector balancing effect provided by arranging two magnetic paths. That is, in the rotary electric machine of this preferred embodiment, the fourth harmonic permeance components can be balanced in three ways.

It is preferable in the rotary electric machine of this preferred embodiment that the permanent magnets of the rotor be magnetized after being assembled. This improves the quality and reduces the cost. In this preferred embodiment, magnetization in a positive direction along the axial direction is performed first, and thereafter magnetization in the opposite direction is performed. This is because, if magnetization is performed in both the opposite directions at the same time, a sufficient level of magnetizing force does not reach the permanent magnets due to magnetic flux repulsion. More specifically, referring to FIG. 2, a magnetic field having a required level of strength is applied from the outside of the rotary electric machine for the purpose of mainly magnetizing the permanent magnet 36 in the first magnetization. Then, a magnetic field having a required level of strength for magnetizing the permanent magnet 37 is partially applied. In the second magnetization, the magnetizing force is applied in the opposite direction to that in the first magnetization, and preferably has a different level of strength from that in the first magnetization after appropriate strength adjustment. The magnetizing manner in this preferred embodiment, in which magnetization in the opposite directions in the axial direction are performed at different times and the magnetizing force is appropriately changed between the first magnetization and the second magnetization, enables the two permanent magnets to be sufficiently magnetized in the opposite directions to each other. Due to this magnetizing manner, it is possible to provide an inexpensive high-quality permanent-magnet rotary electric machine which can offer the aforementioned performances in this preferred embodiment.

In the above description, the example is described in which plates obtained preferably by punching are successively rotated by 90° from adjacent plates in the same direction, for example. However, the present invention is not limited to this structure and arrangement. It is only necessary that one plate in a lamination unit of four plates is rotated by 90° from any one of the remaining plates when the four plates are rotated in the same direction. That is, the lamination unit of four plates includes the plate as a reference plate and three plates rotated by 90°, 180° and 270° from the reference plate. With this lamination, the same effects described above can be obtained.

Second Preferred Embodiment

Figure 9:
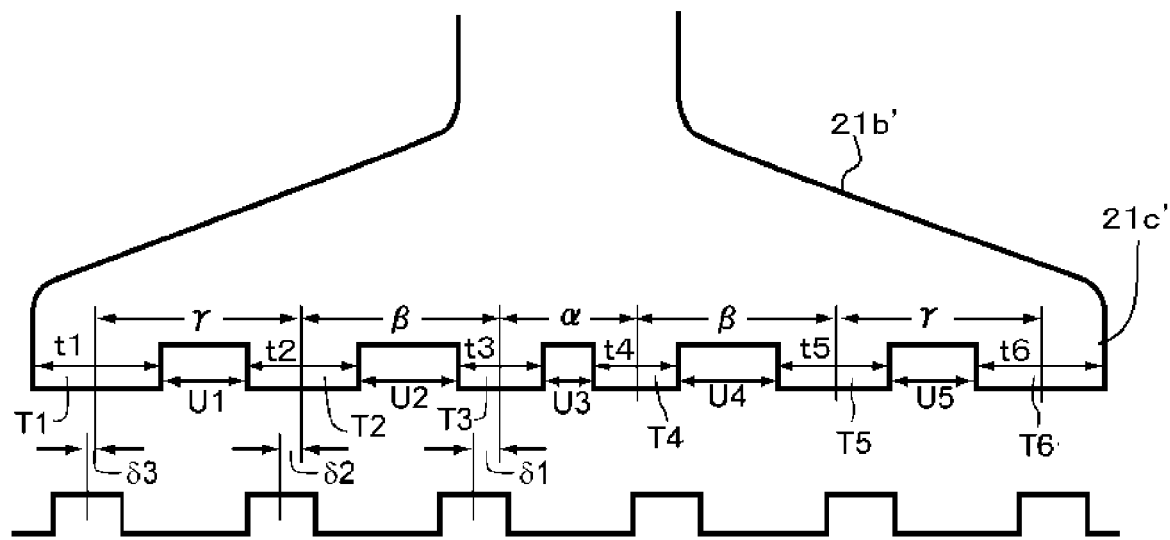
FIG. 9 shows a positional relationship between a main pole of a stator and a rotor magnetic pole in a rotary electric machine according to a second preferred embodiment of the present invention.
Figure 10:
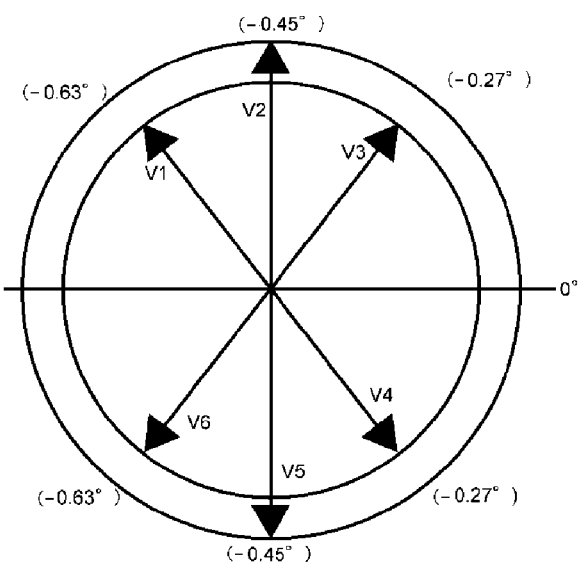
FIG. 10 shows balancing of vectors in the rotary electric machine of FIG. 9.
Figure 11:
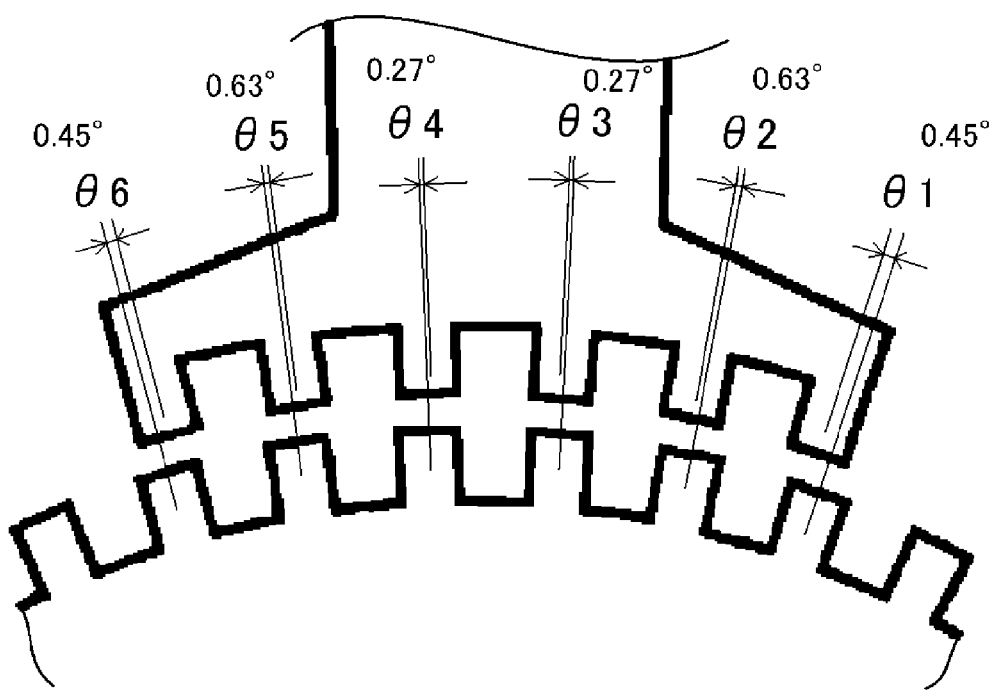
FIG. 11 shows deviation angles of inductor teeth of the stator from opposed magnetic teeth of the rotor in the rotary electric machine of FIG. 9.

The second preferred embodiment of the present invention is now described referring to FIGS. 9 to 11. In the following description, the same reference signs as those in the first preferred embodiment are used for the same or similar components as/to those in the first preferred embodiment.

FIG. 9 shows six inductor teeth 21$c'$, for example, in a stator main pole 21$b'$ in this preferred embodiment. The six inductor teeth 21$c'$ are arranged at irregular pitches and the widths thereof are not all the same. As a typical two-phase, eight-main-pole HB type stepper motor, a stepper motor is widely used in which the number of magnetic teeth of a rotor is preferably 50, a step angle is preferably about 1.8°, and one revolution preferably corresponds to 200 steps, for example. In the stepper motor, when six inductor teeth are arranged at the tip of each of eight main poles, for example, the total number of the stator teeth in the stepper motor is 48, which is close to the total number of the rotor teeth, 50. Therefore, a preferred upper limit of number of the inductor teeth of each main pole is 6.

It is assumed that the six inductor teeth T1 to T6 are arranged in that order in the rotation direction of the rotor (from left to right in the example of FIG. 9) and have the tooth widths t1 to t6; the grooves between the inductor teeth T1 to T6 have the widths U1 to U5; and the center of the groove between the inductor teeth T3 and T4 is positioned at the center of the main pole. In this preferred embodiment, two innermost inductor teeth T3 and T4 in the central region of the six inductor teeth T1 to T6 are arranged at the first pitch α, two intermediate inductor teeth T2 and T5 on the outside of the innermost inductor teeth T3 and T4 are arranged at the second pitch β from the inner adjacent inductor teeth T3 and T4, respectively, and outermost inductor teeth T1 and T6 on the outside of the intermediate inductor teeth T2 and T5 are arranged at the third pitch γ from the inner adjacent inductor teeth T2 and T5, respectively. Please note that the tooth pitch in this application indicates the distance between the center of one inductor tooth and the center of the inner adjacent inductor tooth or the distance between the centers of the innermost inductor teeth. In this preferred embodiment, the tooth pitches, the tooth widths and the groove widths preferably are symmetrical with respect to the center of the main pole passing through the center of the groove having the width U3. That is, t1=t6, t2=t5, t3=t4, U1=U5, and U2=U4.

With that arrangement, it is possible to increase the flexibility of designing deviation angles δ1 to δ6 between the respective inductor teeth of the stator and the corresponding opposed teeth of the rotor when the center of the groove between given rotor teeth is coincident with the center of the groove having the width U3 as shown in FIG. 9, as compared with a case where the inductor teeth are arranged at a regular pitch. Moreover, even if the outermost inductor teeth T1 and T6 have the same width as the innermost inductor teeth T3 and T4, the permeance of the inductor teeth T1 and T6 is different from that of the inductor teeth T3 and T4 because of a magnetic resistance difference, a difference of magnetic path of magnetic flux leakage and the like which depend on the location of the inductor tooth. For example, the magnetic path of the magnetic flux leakage from the inductor tooth is changed depending on the shape of the groove between the teeth, and therefore the permeance of the outermost inductor tooth is different from those of other inductor teeth. However, the irregular-pitch and width arrangement of the inductor teeth in this preferred embodiment enables the permeance difference to be compensated, thereby making the permeances of the six inductor teeth substantially the same. In this preferred embodiment, if the six inductor teeth have the same tooth width and the permeance of the outermost inductor teeth T1 and T6 are smaller than that of the innermost inductor teeth T3 and T4, for example, the permeance difference between the outermost inductor teeth and the innermost inductor teeth can be compensated by changing the tooth widths in such a manner that the tooth width of the outermost inductor teeth is larger than that of the innermost inductor teeth, i.e., t1=t6>t3=t4.

All the groove widths U1 to U3 may be different from one another, all the tooth widths t1 to t3 may be different from one another, and all the tooth pitches α, β and γ may be different from one another. In this preferred embodiment, it is necessary that at least one of the three groove widths is different from the remaining groove width(s), at least one of the three tooth widths is different from the remaining tooth width(s), and at least one tooth pitch is different from the remaining tooth pitch(es). It is preferable for increasing a torque that tooth-width ratios, i.e., a value obtained by dividing the tooth width t3 (=t4) by the first pitch α, a value obtained by dividing the tooth width t2 (=t5) by the second pitch β, and a value obtained by dividing the tooth width t1 (=t6) by the third pitch γ are approximately 0.4, for example. That is, it is preferable that t1/α=t2/β=t3/γ=0.4. When those values are much smaller than about 0.4, saturation of the magnetic fluxes from the teeth can easily occur. To the contrary, when those values are much larger than about 0.4, the magnetic flux leakage increases. The preferred value of approximately 0.4 is obtained from computer analysis and experiments both performed by the inventors of preferred embodiments of the present invention.

FIG. 10 shows exemplary distribution of the permeance vectors of the irregular-pitch inductor teeth in the fourth plane. Assuming that the first pitch α is about 6.66° and the second and third pitches β and γ are about 7.02° in FIG. 9, for example, the deviation angles δ1 to δ6 of the inductor teeth T1 to t6 of the stator from the corresponding opposed rotor teeth are values in parenthesis in FIG. 10 in mechanical angle, respectively, and the fourth permeance vectors V1 to V6 of the inductor teeth T1 to T6 are distributed as shown in FIG. 10. The sum of the vectors V1 to V6 is zero. If the vectors V2 and V5 have larger magnitudes than those of other vectors, the vectors V2 and V5 are canceled. In addition, the vectors V1, V2 and V3 arranged at one side of the center of the main pole are canceled out by one another, while the vectors V4, V5 and V6 arranged at the other side are canceled by one another. That is, the vectors on the same side of the center of the main pole are canceled out by one another. This means that the flexibility of balancing the vectors is increased in the irregular-pitch arrangement of the inductor teeth as compared in the regular-pitch arrangement.

In the above description, the number Ns of the inductor teeth preferably is 6. If Ns=5, the aforementioned vector balancing is performed for five vectors in the fourth plane. The aforementioned vector balancing is the first balancing of the permeance vectors in the fourth plane in this preferred embodiment.

It has been already described that the preferred upper limit of the number of the inductor teeth is 6 when the total number of the rotor teeth is 50 and the number of the main poles is 8, for example. Under that condition, it is desirable that the spaces between the eight main poles be as large as possible for the purpose of ensuring easy winding of coils around the respective main poles, because coil has to be inserted into the spaces between the main poles during the winding process. In order to achieve this, it is necessary that the first, second, and third pitches α, β and γ of the irregular-pitch inductor teeth arrangement and the tooth pitch c of the rotor tooth satisfy the following relationship from FIG. 9. The first, second and third pitches α, β and γ are designed to minimize or eliminate the fourth harmonic components of the permeances of the inductor teeth which result in the cogging torque, as described above.

$$\{(\alpha+2\beta+2\gamma)/5\}<c \quad \text{(Expression 7)}$$

The left-hand portion of Expression 7 represents an average of the first, second and third pitches. That is, Expression 7 indicates that the first, second and third pitches α, β and γ can be larger than the rotor tooth pitch c but it is necessary for the average of those tooth pitches of the six inductor teeth to be smaller than the rotor tooth pitch.

In the example of FIG. 10, the first pitch α is different from the second and third pitches β and γ which are equal to each other, and all the first, second and third pitches α, β and γ are smaller than the rotor tooth pitch c, i.e., about 7.2°. Another exemplary irregular-pitch arrangement of the inductor teeth of this preferred embodiment is shown in FIG. 11, in which α≠β≠γ. The first pitch α is about 6.66°; the second pitch β is about 6.84°; and the third pitch γ is about 7.38°. Only the third pitch γ is larger than the rotor tooth pitch c, about 7.2°, for example. In this example, the deviation angles θ1 to θ6 of the inductor teeth from the corresponding opposed rotor teeth are values shown in FIG. 11. The fourth permeance component P4 of the main pole is calculated as follows.

$$P4 = \cos(4\cdot\theta3) + \cos(4\cdot\theta2) + \cos(4\cdot\theta1) + \quad \text{(Expression 8)}$$
$$\cos(4\cdot\theta4) + \cos(4\cdot\theta5) + \cos(4\cdot\theta6)$$
$$= 2\left\{\begin{array}{l}\cos(4\times0.27°\times360°/7.2°)+\\ \cos(4\times0.63°\times360°/7.2°)+\\ \coscos(4\times0.45°\times360°/7.2°)\end{array}\right\}$$
$$= \cos54° + \cos126° + \cos90°$$
$$= 0.5877 - 0.5877$$
$$= 0$$

In this case, the fundamental permeance component P1 of the main pole, which generates interlinking magnetic fluxes and the motor torque, is calculated as follows.

$$P1 = \cos\theta3 + \cos\theta2 + \cos\theta1 + \cos\theta4 + \cos\theta5 + \cos\theta6 \quad \text{(Expression 9)}$$
$$= 2\{\cos13.5° + \cos31.5° + \cos22.5°\}/6$$
$$= 0.9163$$

Expression 9 shows that about 91.6% of the permeance of the main pole constitutes the motor torque component. This value is larger than about 90% obtained in the regular-pitch inductor teeth arrangement. Therefore, the irregular-pitch arrangement is more advantageous to provide a high torque than the regular-pitch arrangement.

The preferred embodiments of the present invention are described above. However, the present invention is not limited thereto. For example, when m is set to 2 or 3 in the 4m-pole stator of the rotary electric machine of the preferred embodiments, the stator having eight or twelve main poles which is suitable for practical use is obtained. The stepper motor having that stator has small winding inductance, has small torque reduction during a high-speed rotation, has a flat torque curve, and is very useful from a low-speed operation to a high-speed operation. The eight-main-pole stator can be adapted to a two-phase rotary electric machine only, whereas the twelve-main-pole stator can be adapted to both a two-phase rotary electric machine and a three-phase rotary electric machine.

In order to reduce the price of the rotary electric machine while the size and torque are kept the same as those of conventional machines, it is preferable to arrange two separate magnetic circuits in the axial direction as described in the preferred embodiments of the present invention. With this arrangement, the magnetic path can be shortened and a low-grade magnet such as a ferrite magnet can be used in the magnetic circuit. In a case of using a ferrite magnet, it is preferable that the ferrite magnet has a residual magnetic flux density of approximately 0.5 T or less, for example. Thus, the cost can be reduced. Moreover, in the case of using the ferrite magnet, the operating point can be stable due to a flat slope of B-H curve of the ferrite magnet, thus providing more uniform magnetic flux density. Therefore, a low-vibration motor with small variations can be obtained. This is because, when B-H curve has a substantially flat slope, the change of the magnetic flux value can be kept small even if the operating point is moved by the variation in the air gap dimension or the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A permanent-magnet rotary electric machine comprising:
    a stator including an approximately ring-shaped core back portion having an angular or rounded outer shape, and 4m main poles radially projecting from the core back portion where m is an integer equal to or larger than 2, each of the main poles having Ns inductor teeth at a tip thereof where Ns is an integer equal to or larger than 2; and
    a rotor opposed to the stator via an air gap to be freely rotatable and including two rotor units adjacent to each other in an axial direction, each of the rotor units including a pair of rotor magnetic poles and a permanent magnet which arranged between the rotor magnetic poles, the permanent magnet of one of the rotor units and the permanent magnet of the other rotor unit being magnetized in opposite directions along the axial direction; wherein
    each of the rotor magnetic poles has Nr magnetic teeth at a regular pitch on an outer periphery thereof where Nr is an integer equal to or larger than 2, the pair of rotor magnetic poles of each of the rotor units are arranged with the magnetic teeth of one of the rotor magnetic poles offset from those of the other rotor magnetic pole by half of the pitch in a circumferential direction and with the magnetic teeth of adjacent rotor magnetic poles aligned with each other in the axial direction;
    a tooth pitch of the inductor teeth of each of the main poles of the stator is different from the pitch of the magnetic teeth of the rotor to generate a fourth harmonic component of a permeance between the stator and the rotor substantially zero; and
    adjacent rotor magnetic poles of the rotor units have a same polarity as one another.

2. A permanent-magnet rotary electric machine according to claim 1, wherein the stator core includes a lamination of a plurality of magnetic plates, each one of the magnetic plates is successively rotated by 90° from an adjacent one of the magnetic plates.

3. A permanent-magnet rotary electric machine according to claim 2, wherein the Ns inductor teeth of each of the 4m main poles of the stator are arranged at a regular pitch which is different from the pitch of the magnetic teeth of each of the rotor magnetic poles by approximately 90°/(Ns·Nr).

4. A permanent-magnet rotary electric machine according to claim 2, wherein the Ns inductor teeth of each of the 4m main poles of the stator are arranged at a regular tooth pitch which is different from the pitch of the magnetic teeth of each of the rotor magnetic poles by approximately 60°/(Ns·Nr); and
    Ns vectors of six harmonic components of permeances of the Ns inductor teeth of each of the 4m main poles are balanced in the sixth plane.

5. A permanent-magnet rotary electric machine according to claim 2, wherein the Ns inductor teeth are arranged at irregular tooth pitches and an average of the tooth pitches is different from the pitch of the magnetic teeth of each of the rotor magnetic poles by approximately 60°/(Ns·Nr).

6. A permanent-magnet rotary electric machine according to claim 1, wherein the permanent magnet of each of the rotor units is a ferrite permanent magnet having a residual magnetic flux density of approximately 0.5 T or less.

7. A permanent-magnet rotary electric machine according to claim 2, wherein the stator includes eight main poles radially arranged and each including six inductor teeth at the tip thereof, and each of the rotor magnetic poles of the two rotor units includes 50 magnetic teeth on the outer periphery thereof;
    the six inductor teeth are arranged at tooth pitches $\alpha$, $\beta$ and $\gamma$ where the tooth pitch $\alpha$ represents a pitch between two innermost inductor teeth, the tooth pitch $\beta$ is a pitch between each of two intermediate inductor teeth arranged on the outside of the innermost inductor teeth and an adjacent one of the innermost inductor teeth, and the tooth pitch $\gamma$ is a pitch between each of two outermost inductor teeth arranged on the outside of the outermost inductor teeth and an adjacent one of the intermediate inductor teeth;
    the tooth pitches $\alpha$, $\beta$ and $\gamma$ satisfy relationship of $(\alpha+2\beta+2\gamma)<5c$, where c represents the pitch of the magnetic teeth of the rotor magnetic pole, and at least the tooth pitch $\alpha$ is different from the other tooth pitch(es); and
    the fourth harmonic components of permeances of the six inductor teeth are balanced by one another.

8. A permanent-magnet rotary electric machine according to claim 7, wherein, when the six inductor teeth of each of the main poles have tooth widths t1, t2, t3, t4, t5 and t6 in that order in a rotation direction of the rotor, the tooth widths t1, t2, t3, t4, t5 and t6 are determined symmetrically with respect to a center line of the main pole to satisfy relationships of t1=t6, t2=t5, and t3=t4, at least one of the tooth widths t1, t2 and t3 is different from the other tooth widths, and a value obtained by dividing the tooth width of each inductor tooth by the tooth pitch thereof from an inner adjacent inductor tooth, t1/$\alpha$, t2/$\beta$ and t3/$\gamma$ is approximately 0.4.

9. A method for manufacturing the permanent-magnet rotary electric machine of claim 1, comprising assembling the permanent magnet with the rotor magnetic poles while being non-magnetized, and after assembling, performing magnetization in one direction and then performing magnetization in an opposite direction thereto, thereby successively magnetizing both the permanent magnets in the rotor.

10. A method for manufacturing a permanent-magnet rotary electric machine comprising a stator including an approximately ring-shaped core back portion having an angular or rounded outer shape, and 4m main poles radially projecting from the core back portion where m is an integer equal to or larger than 2, each of the main poles having Ns inductor teeth arranged at a regular pitch at a tip thereof where Ns is an integer equal to or larger than 2, and a rotor opposed to the stator via an air gap, the rotor arranged to be freely rotatable and including two rotor units adjacent to each other in an axial direction, each of the rotor units including a pair of rotor magnetic poles and a permanent magnet arranged therebetween, the permanent magnet of one of the rotor units and the permanent magnet of the other rotor unit being magnetized in opposite directions along the axial direction, each of the rotor magnetic poles having Nr magnetic teeth at a regular pitch on an outer periphery thereof where Nr is an integer equal to or larger than 2, the pair of rotor magnetic poles of each of the rotor units are arranged with the magnetic teeth of one of the rotor magnetic poles offset from those of the other rotor magnetic pole by half of the pitch in a circumferential direction and with the magnetic teeth of adjacent rotor magnetic poles aligned with each other in the axial direction, the pitch of the inductor teeth of the stator is different from the pitch of the magnetic teeth of the rotor by approximately $90°/(Ns \cdot Nr)$, the method comprising the steps of:

forming a plurality of magnetic plates by punching;
   successively rotating each of the magnetic plates by 90° from an adjacent one of the magnetic plates; and
   laminating the rotated magnetic plates.

* * * * *